US010521764B1

(12) United States Patent
Davies (10) Patent No.: US 10,521,764 B1
(45) Date of Patent: Dec. 31, 2019

(54) MULTISERVER RECONFIGURATION FROM BUFFER AND STOP CONTROLS

(71) Applicant: eStack LLC, Seattle, WA (US)

(72) Inventor: Robert Davies, Sammamish, WA (US)

(73) Assignee: eStack LLC, Seattle, WA (US)

( * ) Notice: Subject to any disclaimer, the term of this patent is extended or adjusted under 35 U.S.C. 154(b) by 616 days.

(21) Appl. No.: 15/059,687

(22) Filed: Mar. 3, 2016

(51) Int. Cl.
*G06Q 10/00* (2012.01)
*G06Q 10/08* (2012.01)

(52) U.S. Cl.
CPC .................................. *G06Q 10/087* (2013.01)

(58) Field of Classification Search
CPC ............................. G06Q 10/087; G06F 17/30
USPC ...................................................... 705/16, 28
See application file for complete search history.

(56) References Cited

U.S. PATENT DOCUMENTS

| 5,953,707 A * | 9/1999 | Huang ................... G06Q 10/06 705/7.25 |
| 6,954,736 B2 * | 10/2005 | Menninger ............ G06Q 10/06 705/28 |
| 2002/0143669 A1 * | 10/2002 | Scheer ................. G06Q 10/087 705/28 |
| 2006/0069598 A1 * | 3/2006 | Schweitzer ...... G06Q 10/06315 705/7.25 |
| 2006/0224439 A1 * | 10/2006 | Smith .............. G06Q 10/06375 705/7.35 |

* cited by examiner

*Primary Examiner* — Rokib Masud
(74) *Attorney, Agent, or Firm* — Rowan TELS LLC (57) ABSTRACT

Multi-server control processes including receiving controls from various control memory structures, comparing the received controls, transitioning a machine state based upon those comparisons, and sending further control signals to affect the operation of one or more servers.

20 Claims, 8 Drawing Sheets

MULTISERVER RECONFIGURATION FROM BUFFER AND STOP CONTROLS

BACKGROUND

Businesses selling via online marketplace platforms (Amazon, eBay, etc.) must manage their inventory for various reasons. One major problem these businesses face is maintaining correct stock levels. Marketplaces have rules and systems for providing visibility for a merchant's listings. Experience teaches that merchants who consistently ship quality products on demand get better placement, which results in increased sales volume. Running out of stock or shipping non-quality products is undesirable (resulting in days of lost sales) and complicates inventory management, as running out of stock or shipping non-quality products will affect the "momentum" of the stock-keeping unit long after stock has been replenished.

In conventional inventory management systems, a common problem is tying up too much resource in unnecessary inventory management to ensure that stock is present and of high quality. Applying resources to unnecessary tasks reduces workforce available to other, more important tasks.

BRIEF SUMMARY

Embodiments are disclosed of a multi-server control process that utilizes a target buffer stock-keeping unit control that can be set at the stock-keeping unit level to alter a presentation status of the stock-keeping unit on one or more servers. In further embodiments, one or more combination stock-keeping units may have their presentation status altered on one or more servers when one of the component stock-keeping units of the one or more combination stock-keeping units has its presentation status altered. Additional embodiments include altering the presentation status on one or more servers when the available stock of a stock-keeping unit reaches zero and when an emergency stop function is used.

Embodiments further alter the presentation status of the stock-keeping units on one or more servers to re-set the presentation status upon receiving a start condition. In further embodiments, one or more combination stock-keeping units may have their presentation status re-set on one or more servers when one of the component stock-keeping units of the one or more combination stock-keeping units has its presentation status re-set.

Further embodiments update the presentation status of one or more stock-keeping units at regular intervals (e.g., hourly).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

A multi-server control process receives controls from a stock system that includes a virtual number of items and a buffer number for a stock-keeping unit. The multi-server control process may receive controls for any number of stock-keeping units. The controls are compared. The multi-server control process may then provide instructions to one or more servers that display the stock-keeping unit to discontinue displaying that stock-keeping unit. Once the multi-server control process receives an indication of the actual number of stock-keeping units of any that were discontinued, those stock-keeping units may then be re-displayed or stay discontinued. Additional embodiments may include instructions to affect one or more servers when a stock-keeping unit comprises multiple stock-keeping units, dynamically determining controls, and instructing machines to display aspects of the multi-server control process to enable user oversight.

In some embodiments, a multi-server control process may include receiving a stock-keeping unit control from a stock-keeping unit control memory structure, receiving a target buffer stock-keeping unit control from a target buffer stock-keeping unit control memory structure, comparing the target buffer stock-keeping unit level to the current stock-keeping unit stock level for each of the one or more stock-keeping units, applying one or more stop signals to one or more servers in response to a machine state for one or more of the one or more stock-keeping units, transitioning the machine state responsive to a start condition for each of the one or more stock-keeping units that have the machine state, and/or sending one or more start signals to the one or more servers in response to the start condition.

In some embodiments, the stock-keeping unit control may include a current stock-keeping unit stock level for each of one or more stock-keeping units.

In some embodiments, the target buffer stock-keeping unit control may include a target buffer stock-keeping unit level for each of the one or more stock-keeping units.

In some embodiments, the one or more stop signals may include controls to discontinue a presentation status of the one or more stock-keeping units to which the machine state applies.

In some embodiments, the machine state for each of the one or more stock-keeping units is set on condition that the current stock-keeping unit stock level is less than or equal to the target buffer stock-keeping unit level.

In some embodiments, the one or more start signals may include instructions to re-set the presentation status the one or more stock-keeping units to which the start condition applies.

In some embodiments, the multi-server control process, the presentation status is a machine displayed for-sale status.

In some embodiments, the one or more stop signals may further include controls to discontinue selling one or more combination stock-keeping units.

In some embodiments, the one or more combination stock-keeping units may include a group of stock-keeping units.

In some embodiments, the one or more combination stock-keeping units discontinued may include at least one of the one or more stock-keeping units discontinued from sale by the one or more stop signals.

In some embodiments, such a multi-server control process may further include the stock-keeping unit control, comparing the current stock-keeping unit stock level to the target buffer stock-keeping unit level for each of the group of stock-keeping units used in each of the one or more combination stock-keeping units, determining a combination stop condition for each of the one or more combination stock-keeping units, and/or applying the one or more stop signals to discontinue the presentation status of the one or more combination stock-keeping units in response to the combination stop condition activating.

In some embodiments, may further include one or more combination stock-keeping units, each of the group of stock-keeping units used in each of the one or more combination stock-keeping units, the quantity of each of the group of stock-keeping units sold in each of the one or more combination stock-keeping units, and/or the current stock-keeping unit stock level for each of the group of stock-keeping units used in each of the one or more combination stock-keeping units.

In some embodiments, the one or more combination stock-keeping units may include a group of stock-keeping units.

In some embodiments, the combination stop condition may include the current stock-keeping unit stock level.

In some embodiments, the combination stop condition may be less than or equal to the target buffer stock-keeping unit level.

In some embodiments, such a multi-server control process may further include sending a presented combination stock-keeping unit stock level for each of the one or more combination stock-keeping units.

In some embodiments, the presented combination stock-keeping unit stock level is the least of a group of presented combination stock-keeping unit stock level components.

In some embodiments, the group of presented combination stock-keeping unit stock level components may include dividing the current stock-keeping unit stock level less the target buffer stock-keeping unit level by the quantity of each of the group of stock-keeping units sold in each of the one or more combination stock-keeping units for each of the group of stock-keeping units used in each of the one or more combination stock-keeping units.

In some embodiments, the one or more stop signals may further include controls to alter the presentation status on the one or more servers for each of the one or more stock-keeping units to which the machine state applies.

In some embodiments, setting the start condition may include applying a current stock-keeping unit from a current stock-keeping unit control memory structure, comparing the current actual stock-keeping unit stock level to the current stock-keeping unit stock level for each of the one or more stock-keeping units that have the machine state, and/or setting the start condition upon condition that the current actual stock-keeping unit stock level.

In some embodiments, the current stock-keeping unit may include a current actual stock-keeping unit stock level for each of the one or more stock-keeping units.

In some embodiments, may be equal to the current stock-keeping unit stock level.

In some embodiments, such a multi-server control process may further include applying a stock attrition rate from a stock attrition rate control memory structure.

In some embodiments, the stock attrition rate may include an available stock attrition rate for each of the one or more stock-keeping units.

In some embodiments, determining the target buffer stock-keeping unit level for the one or more stock-keeping units may further include modifying the target buffer stock-keeping unit level based on the available stock attrition rate.

In some embodiments, such a multi-server control process may further include displaying on, a machine display, a graphical interface element.

In some embodiments, the graphical interface element displays stock-keeping unit.

In some embodiments, the stock-keeping unit may include the target buffer stock-keeping unit control.

In some embodiments, the stock-keeping unit may include the stock-keeping unit control.

In some embodiments, the stock-keeping unit may include a stock attrition rate.

In some embodiments, such a multi-server control process may further include sending a presented stock-keeping unit stock level for each of the one or more stock-keeping units to affect operation of the one or more servers, the presented stock-keeping unit stock level for each of the one or more stock-keeping units equals the current stock-keeping unit stock level for each of the one or more stock-keeping units less the target buffer stock-keeping unit level for each of the one or more stock-keeping units.

Drawings

Figure 1:
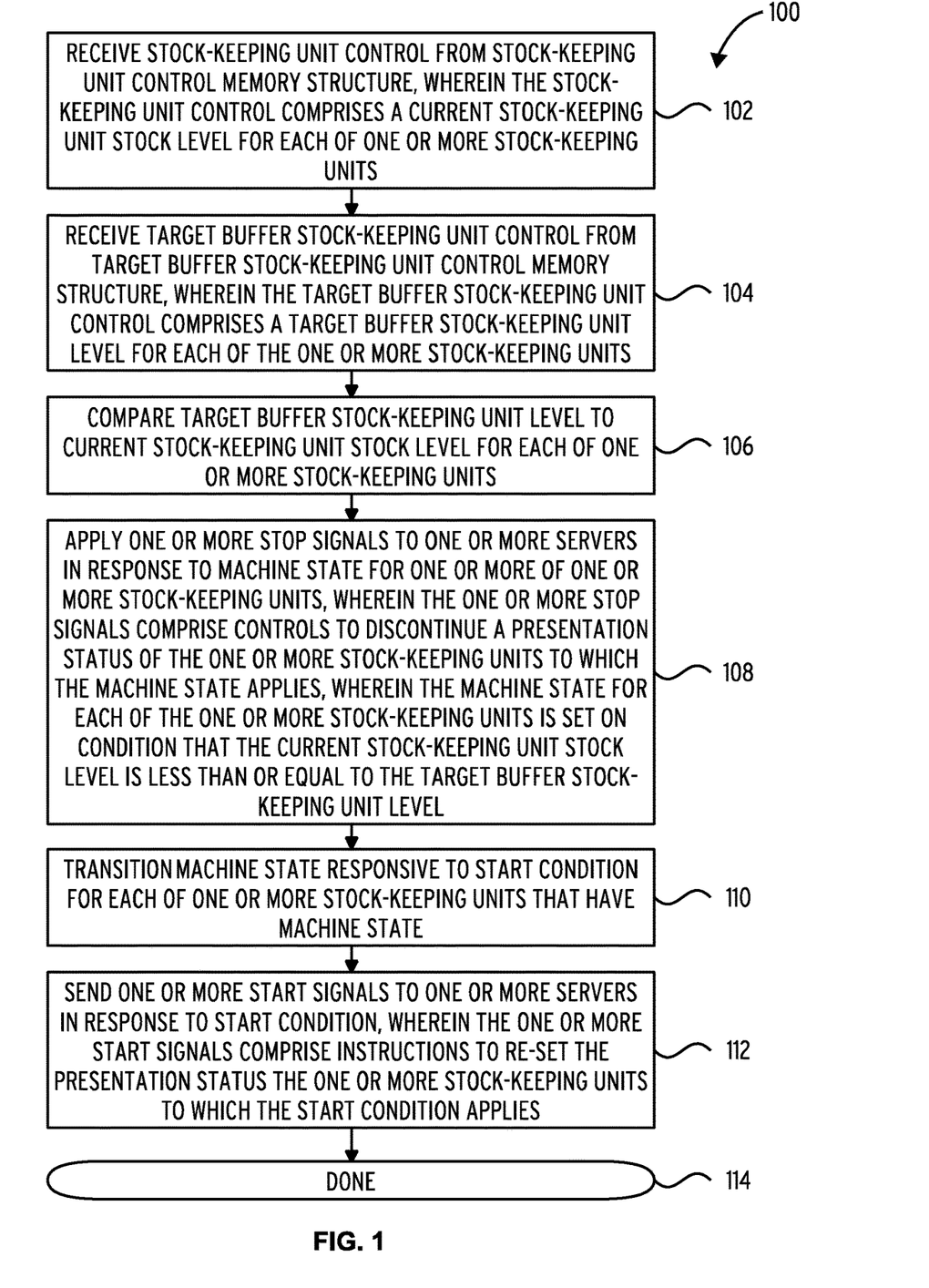
FIG. 1 illustrates an embodiment of a multi-server control process 100.

In block 102, multi-server control process 100 receives a stock-keeping unit control from a stock-keeping unit control memory structure, wherein the stock-keeping unit control comprises a current stock-keeping unit stock level for each of one or more stock-keeping units. In block 104, multi-server control process 100 receives a target buffer stock-keeping unit control from a target buffer stock-keeping unit control memory structure, wherein the target buffer stock-keeping unit control comprises a target buffer stock-keeping unit level for each of the one or more stock-keeping units. In block 106, multi-server control process 100 compares the target buffer stock-keeping unit level to the current stock-keeping unit stock level for each of the one or more stock-keeping units. In block 108, multi-server control process 100 applies one or more stop signals to one or more servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level. In block 110, multi-server control process 100 transitions the machine state responsive to a start condition for each of the one or more stock-keeping units that have the machine state. In block 112, multi-server control process 100 sends one or more start signals to the one or more servers in response to the start condition, wherein the one or more start signals comprise instructions to re-set the presentation status the one or more stock-keeping units to which the start condition applies. In done block 114, multi-server control process 100 ends.

Multi-server control process 100 receives multiple controls from machines, generating a machine state. In response to one or more particular machine states, the multi-server control process 100 transforms those controls to one or more stop signals or one or more start signals, which are then sent to and used to alter one or more servers.

Figure 2:
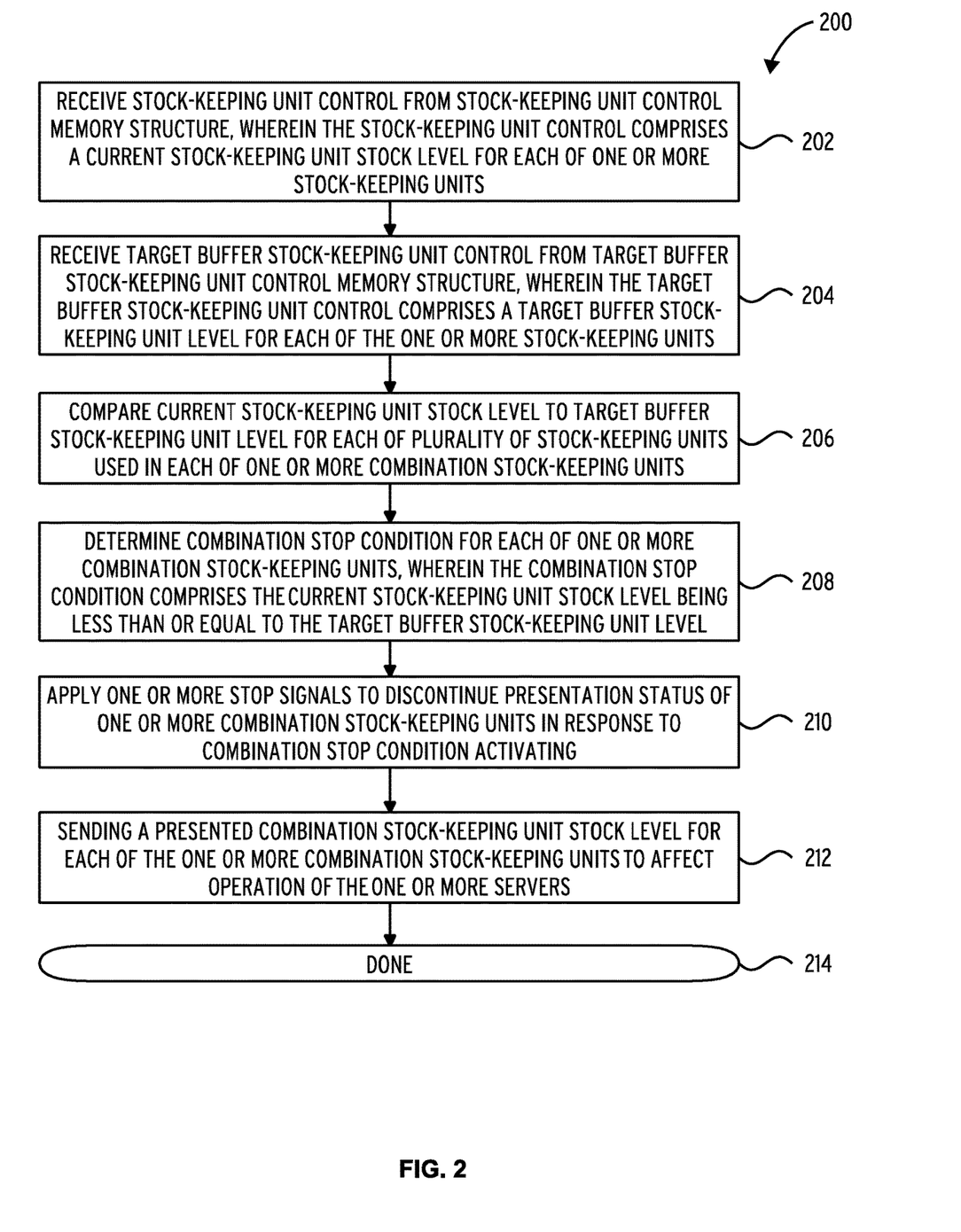
FIG. 2 illustrates an embodiment of a multi-server control process 200.

In block 202, multi-server control process 200 receives a stock-keeping unit control from a stock-keeping unit control memory structure, wherein the stock-keeping unit control comprises a current stock-keeping unit stock level for each of one or more stock-keeping units. In block 204, multi-server control process 200 receives a target buffer stock-keeping unit control from a target buffer stock-keeping unit control memory structure, wherein the target buffer stock-keeping unit control comprises a target buffer stock-keeping unit level for each of the one or more stock-keeping units. In block 206, multi-server control process 200 compares the current stock-keeping unit stock level to the target buffer stock-keeping unit level for each of the plurality of stock-keeping units used in each of the one or more combination stock-keeping units. In block 208, multi-server control process 200 determines a combination stop condition for each of the one or more combination stock-keeping units, wherein the combination stop condition comprises the current stock-keeping unit stock level being less than or equal to the target buffer stock-keeping unit level. In block 210, multi-server control process 200 applies the one or more stop signals to discontinue the presentation status of the one or more combination stock-keeping units in response to the combination stop condition activating, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level. In block 212, multi-server control process 200 sends a presented combination stock-keeping unit stock level for each of the one or more combination stock-keeping units to affect operation of the one or more servers. In done block 214, multi-server control process 200 ends.

Multi-server control process 200 receives multiple controls from machines, generating a machine state. In response to one or more particular machine states, the multi-server control process 200 transforms those controls to one or more stop signals or one or more start signals, which are then sent to and used to alter one or more servers.

Figure 3:
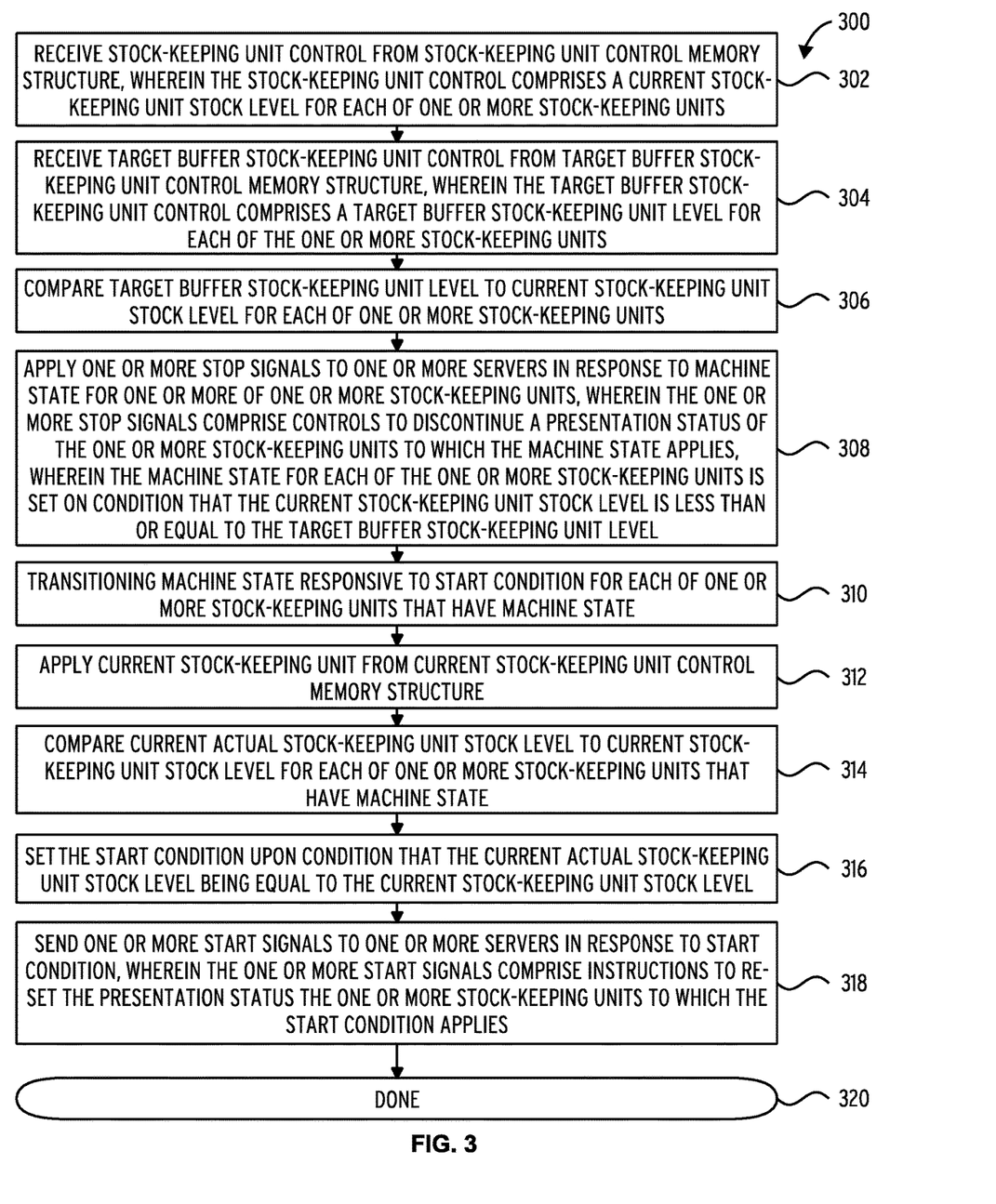
FIG. 3 illustrates an embodiment of a multi-server control process 300.

In block 302, multi-server control process 300 receives a stock-keeping unit control from a stock-keeping unit control memory structure, wherein the stock-keeping unit control comprises a current stock-keeping unit stock level for each of one or more stock-keeping units. In block 304, multi-server control process 300 receives a target buffer stock-keeping unit control from a target buffer stock-keeping unit control memory structure, wherein the target buffer stock-keeping unit control comprises a target buffer stock-keeping unit level for each of the one or more stock-keeping units. In block 306, multi-server control process 300 compares the target buffer stock-keeping unit level to the current stock-keeping unit stock level for each of the one or more stock-keeping units. In block 308, multi-server control process 300 applies one or more stop signals to one or more servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level. In block 310, multi-server control process 300 transitions the machine state responsive to a start condition for each of the one or more stock-keeping units that have the machine state. In block 312, multi-server control process 300 applies a current stock-keeping unit from a current stock-keeping unit control memory structure. In block 314, multi-server control process 300 compares the current actual stock-keeping unit stock level to the current stock-keeping unit stock level for each of the one or more stock-keeping units that have the machine state. In block 316, multi-server control process 300 sets the start condition upon condition that the current actual stock-keeping unit stock level. In block 318, multi-server control process 300 sends one or more start signals to the one or more servers in response to the start condition, wherein the one or more start signals comprise instructions to re-set the presentation status the one or more stock-keeping units to which the start condition applies. In done block 320, multi-server control process 300 ends.

Multi-server control process 300 receives multiple controls from machines, generating a machine state. In response to one or more particular machine states, the multi-server control process 300 transforms those controls to one or more stop signals or one or more start signals, which are then sent to and used to alter one or more servers.

Figure 4:
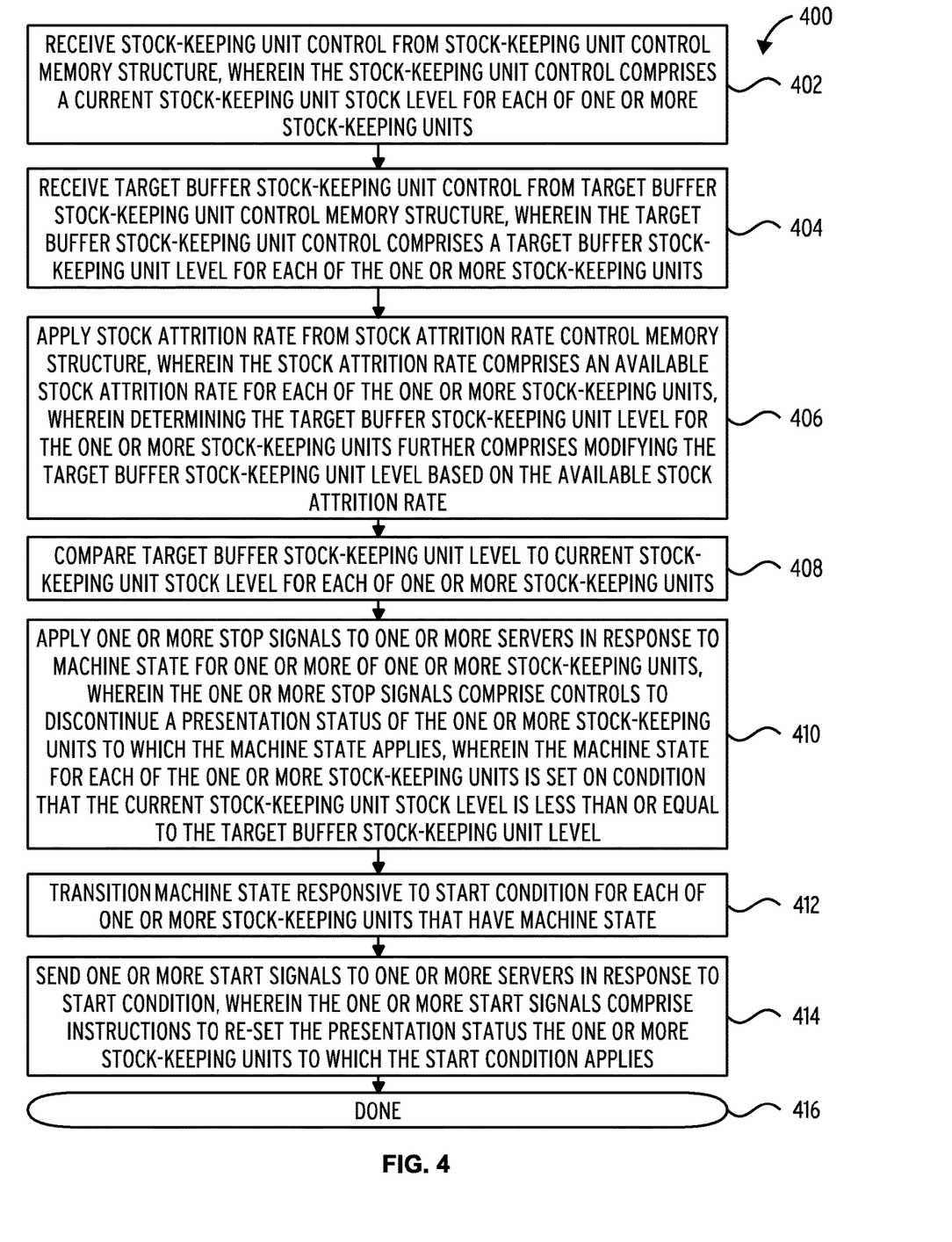
FIG. 4 illustrates an embodiment of a multi-server control process 400.

In block 402, multi-server control process 400 receives a stock-keeping unit control from a stock-keeping unit control memory structure, wherein the stock-keeping unit control comprises a current stock-keeping unit stock level for each of one or more stock-keeping units. In block 404, multi-server control process 400 receives a target buffer stock-keeping unit control from a target buffer stock-keeping unit control memory structure, wherein the target buffer stock-keeping unit control comprises a target buffer stock-keeping unit level for each of the one or more stock-keeping units. In block 406, multi-server control process 400 applies a stock attrition rate from a stock attrition rate control memory structure, wherein the stock attrition rate comprises an available stock attrition rate for each of the one or more stock-keeping units, wherein determining the target buffer stock-keeping unit level for the one or more stock-keeping units further comprises modifying the target buffer stock-keeping unit level based on the available stock attrition rate. In block 408, multi-server control process 400 compares the target buffer stock-keeping unit level to the current stock-keeping unit stock level for each of the one or more stock-keeping units. In block 410, multi-server control process 400 applies one or more stop signals to one or more servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level. In block 412, multi-server control process 400 transitions the machine state responsive to a start condition for each of the one or more stock-keeping units that have the machine state. In block 414, multi-server control process 400 sends one or more start signals to the one or more servers in response to the start condition, wherein the one or more start signals comprise instructions to re-set the presentation status the one or more stock-keeping units to which the start condition applies. In done block 416, multi-server control process 400 ends.

Multi-server control process 400 receives multiple controls from machines, generating a machine state. In response to one or more particular machine states, the multi-server control process 400 transforms those controls to one or more stop signals or one or more start signals, which are then sent to and used to alter one or more servers.

Figure 5:
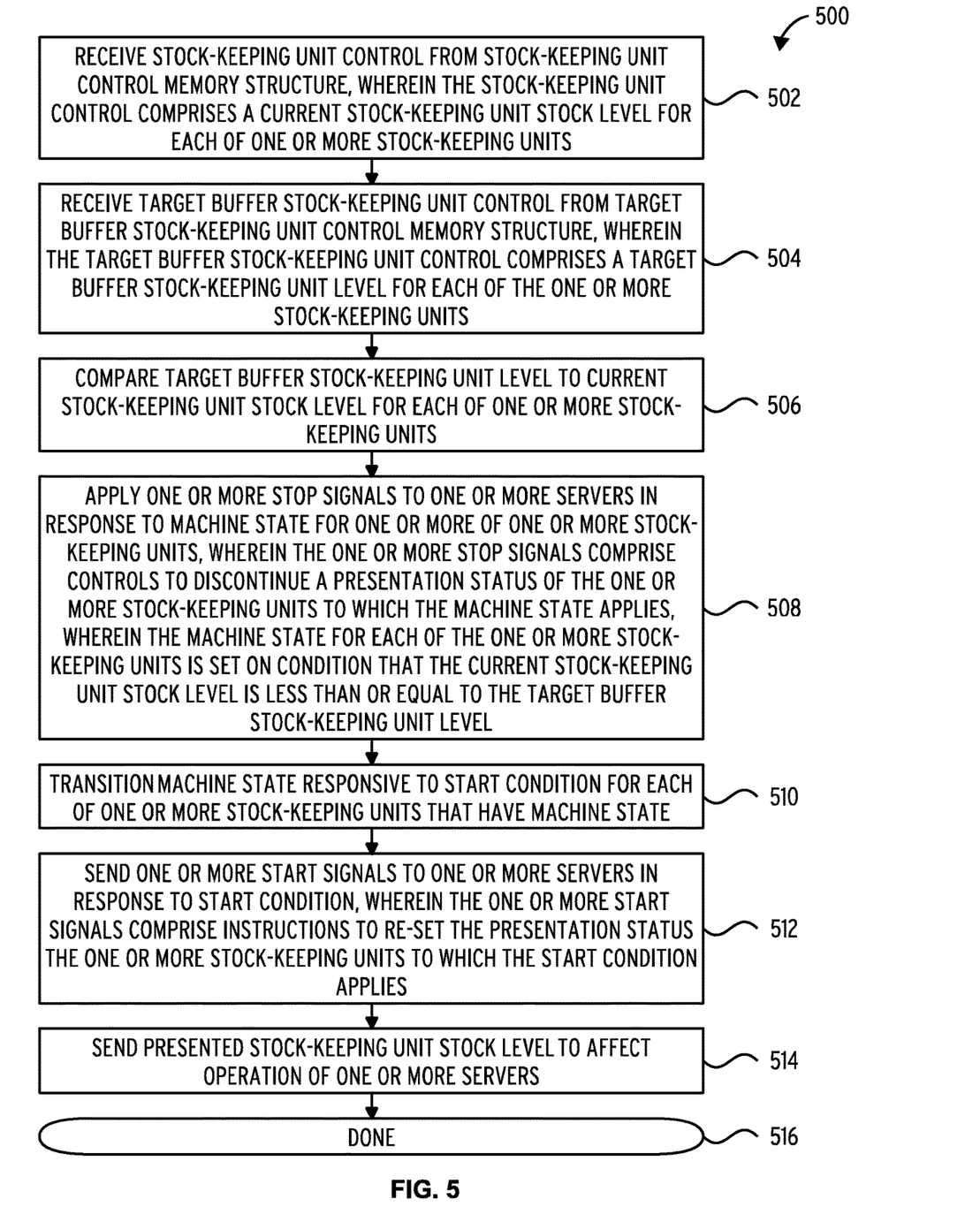
FIG. 5 illustrates an embodiment of a multi-server control process 500.

In block 502, multi-server control process 500 receives a stock-keeping unit control from a stock-keeping unit control memory structure, wherein the stock-keeping unit control comprises a current stock-keeping unit stock level for each of one or more stock-keeping units. In block 504, multi-server control process 500 receives a target buffer stock-keeping unit control from a target buffer stock-keeping unit control memory structure, wherein the target buffer stock-keeping unit control comprises a target buffer stock-keeping unit level for each of the one or more stock-keeping units. In block 506, multi-server control process 500 compares the target buffer stock-keeping unit level to the current stock-keeping unit stock level for each of the one or more stock-keeping units. In block 508, multi-server control process 500 applies one or more stop signals to one or more servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level. In block 510, multi-server control process 500 transitions the machine state responsive to a start condition for each of the one or more stock-keeping units that have the machine state. In block 512, multi-server control process 500 sends one or more start signals to the one or more servers in response to the start condition, wherein the one or more start signals comprise instructions to re-set the presentation status the one or more stock-keeping units to which the start condition applies. In block 514, multi-server control process 500 sends the presented stock-keeping unit stock level to affect operation of the one or more servers. In done block 516, multi-server control process 500 ends.

Multi-server control process 500 receives multiple controls from machines, generating a machine state. In response to one or more particular machine states, the multi-server control process 500 transforms those controls to one or more stop signals or one or more start signals, which are then sent to and used to alter one or more servers.

Figure 6:
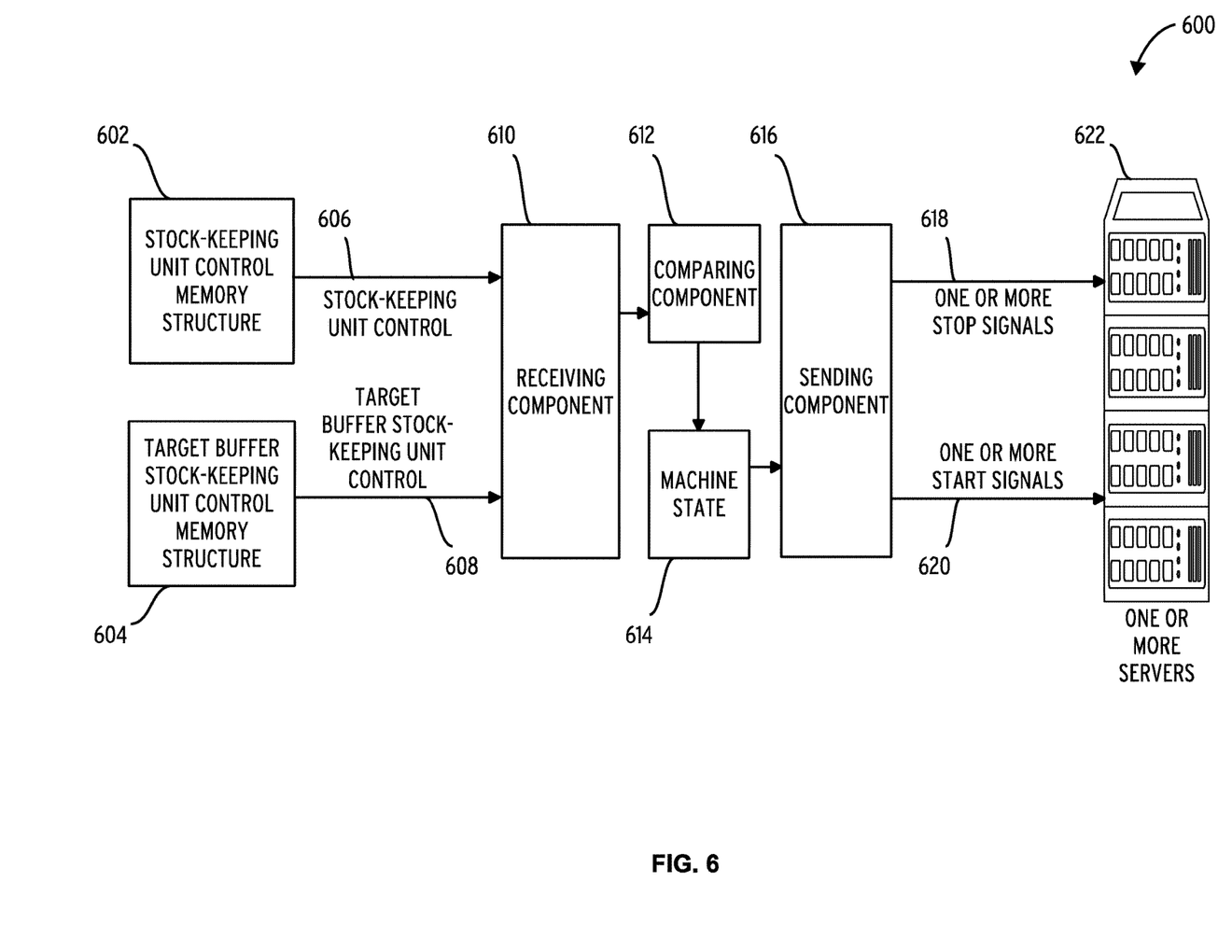
FIG. 6 illustrates an embodiment of a multi-server control process system 600.

The multi-server control process system 600 comprises stock-keeping unit control memory structure 602, target buffer stock-keeping unit control memory structure 604, stock-keeping unit control 606, target buffer stock-keeping unit control 608, receiving component 610, comparing component 612, machine state 614, sending component 616, one or more stop signals 618, one or more start signals 620, and one or more servers 622.

The multi-server control process system 600 may be operated in accordance with the processes described in FIG. 1, FIG. 2, FIG. 3, FIG. 4, and FIG. 5.

Stock-keeping unit control memory structure 602 may store information including controls, such as stock-keeping unit control 606, that may be received by receiving component 610. In some embodiments, stock-keeping unit control memory structure 602 may be configurable by a user or by machine controls. In some embodiments, stock-keeping unit control memory structure 602 may continuously send information via stock-keeping unit control 606 to receiving component 610. In other embodiments, stock-keeping unit control memory structure 602 may send information intermittently via stock-keeping unit control 606 to receiving component 610. In yet further embodiments, stock-keeping unit control memory structure 602 may send information via stock-keeping unit control 606 to receiving component 610 upon user request. Stock-keeping unit control memory structure 602 may be a machine or cloud-based structure.

Target buffer stock-keeping unit control memory structure 604 may store information including controls, such as target buffer stock-keeping unit control 608, that may be retrieved by receiving component 610. In some embodiments, target buffer stock-keeping unit control memory structure 604 may be configurable by a user or by machine controls. In some embodiments, target buffer stock-keeping unit control memory structure 604 may continuously send information via target buffer stock-keeping unit control 608 to receiving component 610. In other embodiments, target buffer stock-keeping unit control memory structure 604 may send information intermittently via target buffer stock-keeping unit control 608 to receiving component 610. In yet further embodiments, target buffer stock-keeping unit control memory structure 604 may send information via target buffer stock-keeping unit control 608 to receiving component 610 upon user request. Target buffer stock-keeping unit control memory structure 604 may be a machine or cloud-based structure.

Stock-keeping unit control 606 may be sent from stock-keeping unit control memory structure 602 to receiving component 610. In some embodiments, stock-keeping unit control 606 may include a current stock-keeping unit stock level for each of one or more stock-keeping units. In other embodiments, stock-keeping unit control 606 may include one or more combination stock-keeping units, wherein the one or more combination stock-keeping units comprise a plurality of stock-keeping units. In further embodiments, stock-keeping unit control 606 may include each of the plurality of stock-keeping units used in each of the one or more combination stock-keeping units. As an illustrative example, stock-keeping unit combination 1 may comprise stock-keeping units A, B, and C. In further embodiments, stock-keeping unit control 606 may include the quantity of each of the plurality of stock-keeping units sold in each of the one or more combination stock-keeping units. To expand upon the illustrative example above, stock-keeping unit combination 1 may comprise stock-keeping units A, B, and C in relative quantities of 3A, 1B, and 2C. In yet further embodiments, stock-keeping unit control 606 may include the current stock-keeping unit stock level for each of the plurality of stock-keeping units used in each of the one or more combination stock-keeping units. In the illustrative example, the current stock-keeping unit stock level for stock-keeping unit combination 1 may be 12A, 7B, and 14C. Stock-keeping unit control 606 may be transmitted over a wired or wireless machine or cloud-based network.

Target buffer stock-keeping unit control 608 may be sent from target buffer stock-keeping unit control memory structure 604 to receiving component 610. In some embodiments, target buffer stock-keeping unit control 608 may include a target buffer stock-keeping unit level for each of the one or more stock-keeping units. Target buffer stock-keeping unit control 608 may be transmitted over a wired or wireless machine or cloud-based network.

Receiving component 610 may receive controls from various memory structures, including stock-keeping unit control memory structure 602 and target buffer stock-keeping unit control memory structure 604. Receiving component 610 may further send these controls to other components, such as a comparing component 612. In some embodiments, receiving component 610 may transform those controls received. For example, receiving component 610 may receive a wireless transmission of a control and transform that control to a wired machine control.

Comparing component 612 may receive information from receiving component 610 in various states as described above. Comparing component 612 may process this information prior to affecting machine state 614. In some embodiments, comparing component 612 may compare the target buffer stock-keeping unit level to the current stock-keeping unit stock level for each of the one or more stock-keeping units. In further embodiments, comparing component 612 may determine that the current stock-keeping unit stock level is greater than, less than, or equal to the target buffer stock-keeping unit level. Comparing component 612 may process a variety of machine controls to affect the machine state 614.

Machine state 614 may receive controls from comparing component 612 and, based on a resulting machine state, transmit further controls to sending component 616. Machine state 614 may be altered by the controls received from comparing component 612. In some embodiments, machine state 614 may be transitioned to a stop condition for a stock-keeping unit upon receiving a control from comparing component 612 that the current stock-keeping unit stock level is less than or equal to the target buffer stock-keeping unit level for that stock-keeping unit. In other embodiments, machine state 614 may be transitioned to a combination stop condition for a one or more combination stock-keeping units upon receiving a control from comparing component 612 that the current stock-keeping unit stock level for one of the plurality of stock-keeping units that comprise the one or more combination stock-keeping units is less than or equal to the target buffer stock-keeping unit level for that specific stock-keeping unit.

Sending component 616 may receive instruction from machine state 614 to send one or more stop signals 618 and/or one or more start signals 620 to affect one or more servers 622 based on the machine state of machine state 614. Sending component 616 may alter the signals to a format that may affect one or more servers 622. In some embodiments, the signals sent by sending component 616 may be wired signals. In other embodiments, the signals sent by sending component 616 may be wireless signals. In further embodiments, these signals may be transmitted over a wired or wireless machine or cloud-based network.

One or more stop signals 618 may be sent from sending component 616 to one or more servers 622. In some embodiments, the one or more stop signals 618 may include controls to discontinue a presentation status. In further embodiments, the presentation status is a machine displayed for-sale status. In other embodiments, one or more stop signals 618 may comprise controls to alter the presentation status on the one or more servers 622 for each of the one or more stock-keeping units under a stop condition of machine state 614. In yet other embodiments, one or more stop signals 618 may comprise controls to discontinue selling one or more combination stock-keeping units. In further embodiments, the one or more combination stock-keeping units discontinued may include at least one of the one or more stock-keeping units discontinued from sale by the one or more stop signals 618. In yet further embodiments, one or more stop signals 618 may affect the presentation status of the one or more combination stock-keeping units in response to the combination stop condition activating. The one or more stop signals 618 may be transmitted over a wired or wireless machine or cloud-based network.

One or more start signals 620 may be sent from sending component 616 to one or more servers 622. In some embodiments, the one or more start signals 620 comprise instructions to re-set the presentation status the one or more stock-keeping units to which the start condition applies. In further embodiments, the presentation status is a machine displayed for-sale status.

One or more servers 622 may receive one or more stop signals 618 and/or one or more start signals 620. In some embodiments, one or more servers 622 may include a presentation status that may be altered by one or more stop signals 618 and one or more start signals 620. One or more servers 622 may be machine-based or cloud-based.

Figure 7:
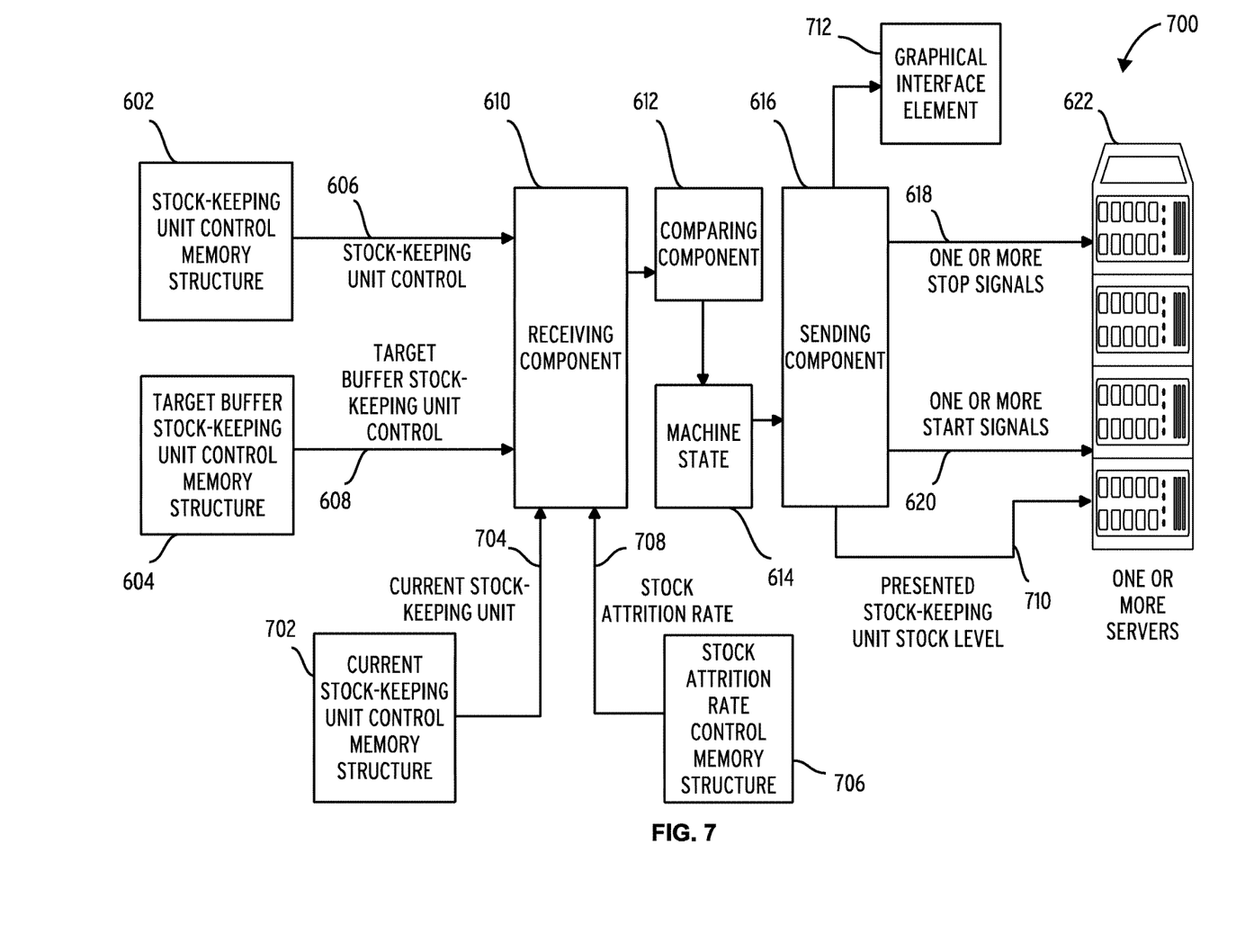
FIG. 7 illustrates an embodiment of a multi-server control process system 700.

The multi-server control process system 700 comprises stock-keeping unit control memory structure 602, target buffer stock-keeping unit control memory structure 604, stock-keeping unit control 606, target buffer stock-keeping unit control 608, receiving component 610, comparing component 612, machine state 614, sending component 616, one or more stop signals 618, one or more start signals 620, one or more servers 622, current stock-keeping unit control memory structure 702, current stock-keeping unit 704, stock attrition rate control memory structure 706, stock attrition rate 708, presented stock-keeping unit stock level 710, and graphical interface element 712.

The multi-server control process system 700 may be operated in accordance with the processes described in FIG. 1, FIG. 2, FIG. 3, FIG. 4, and FIG. 5.

Multi-server control process system 700 includes the components and processes described in multi-server control process system 600 above, as well as the further components and processes described below.

Current stock-keeping unit control memory structure 702 may store information including controls, such as current stock-keeping unit 704, that may be received by receiving component 610. In some embodiments, current stock-keeping unit control memory structure 702 may be configurable by a user or by machine controls. In some embodiments, current stock-keeping unit control memory structure 702 may continuously send information via current stock-keeping unit 704 to receiving component 610. In other embodiments, current stock-keeping unit control memory structure 702 may send information intermittently via current stock-keeping unit 704 to receiving component 610. In yet further embodiments, current stock-keeping unit control memory structure 702 may send information via current stock-keeping unit 704 to receiving component 610 upon user request. Current stock-keeping unit control memory structure 702 may be a machine or cloud-based structure.

Current stock-keeping unit 704 may be sent from current stock-keeping unit control memory structure 702 to receiving component 610. In some embodiments, current stock-keeping unit 704 may include a current actual stock-keeping unit stock level for each of the one or more stock-keeping units. Current stock-keeping unit 704 may be transmitted over a wired or wireless machine or cloud-based network.

In multi-server control process system 700, comparing component 612 may compare the current actual stock-keeping unit stock level to the current stock-keeping unit stock level for each of the one or more stock-keeping units, transmitting controls to machine state 614. In further embodiments, comparing component 612 may determine that the current actual stock-keeping unit stock level is greater than, less than, or equal to the current stock-keeping unit stock level. Further, in multi-server control process system 700, machine state 614 may be altered by the controls received from comparing component 612. In some embodiments, machine state 614 may be transitioned to a start condition for a stock-keeping unit upon receiving a control from comparing component 612 that the current actual stock-keeping unit stock level is equal to the current stock-keeping unit stock level. Machine state 614 may then provide instruction for sending component 616 to send one or more start signals 620 to one or more servers 622.

Stock attrition rate control memory structure 706 may store information including controls, such as stock attrition rate 708, that may be received by receiving component 610. In some embodiments, stock attrition rate control memory structure 706 may be configurable by a user or by machine controls. In some embodiments, stock attrition rate control memory structure 706 may continuously send information via stock attrition rate 708 to receiving component 610. In other embodiments, stock attrition rate control memory structure 706 may send information intermittently via stock attrition rate 708 to receiving component 610. In yet further embodiments, stock attrition rate control memory structure 706 may send information via stock attrition rate 708 to receiving component 610 upon user request. Stock attrition rate control memory structure 706 may be a machine or cloud-based structure.

Stock attrition rate 708 may be sent from stock attrition rate control memory structure 706 to receiving component 610. In some embodiments, stock attrition rate 708 may include an available stock attrition rate for each of the one or more stock-keeping units. Stock attrition rate 708 may be transmitted over a wired or wireless machine or cloud-based network.

In multi-server control process system 700, comparing component 612 may determine the target buffer stock-keeping unit level for the one or more stock-keeping units by further modifying the target buffer stock-keeping unit level based on the available stock attrition rate. In some embodiments, comparing component 612 may then compare this modified target buffer stock-keeping unit level to the current stock-keeping unit stock level for each of the one or more stock-keeping units.

Presented stock-keeping unit stock level 710 may be sent from sending component 616 to affect one or more servers 622. In some embodiments, presented stock-keeping unit stock level 710 may affect the presentation status of one or more servers 622. In other embodiments, one or more servers 622 may compare the current presentation status to the presented stock-keeping unit stock level 710. In another embodiment a presented combination stock-keeping unit stock level may be sent from sending component 616 to affect one or more servers 622.

Graphical interface element 712 may receive information from sending component 616. In some embodiments, graphical interface element 712 may be displayed on virtual or machine display components. In some embodiments, graphical interface element 712 displays stock-keeping unit information. In some embodiments, stock-keeping unit information may include the target buffer stock-keeping unit control. In further embodiments, stock-keeping unit information may include the stock-keeping unit control. In yet further embodiments, stock-keeping unit information may include a stock attrition rate. The information included in stock-keeping unit and displayed on a virtual or machine display by graphical interface element 712 may include any information contained with the controls received, results of comparisons made, statuses of a machine state, and any of one or more stop signals or one or more start signals for any of one or more stock-keeping units.

Figure 8:
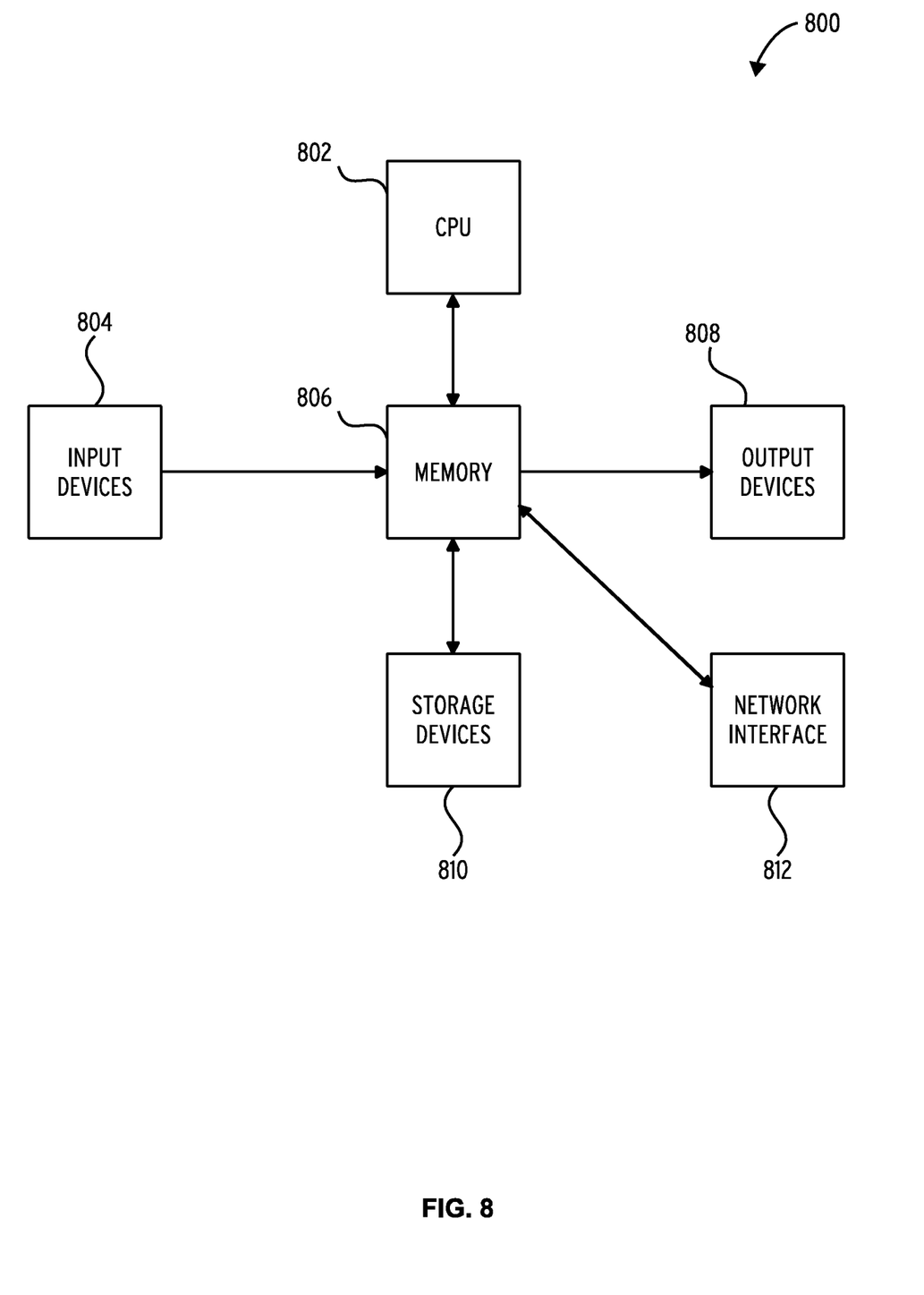
FIG. 8 illustrates an embodiment of a digital apparatus 800 to implement components and process steps of the system described herein.

FIG. 8 illustrates an embodiment of a digital apparatus 800 to implement components and process steps of the system described herein.

Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory 806.

The memory 806 is typically what is known as a first or second level memory device, providing for storage (via configuration of matter or states of matter) of signals received from the input devices 804, instructions and information for controlling operation of the CPU 802, and signals from storage devices 810.

Information stored in the memory 806 is typically directly accessible to the CPU 802 of the device. Signals input to the device cause the reconfiguration of the internal material/energy state of the memory 806, creating in essence a new machine configuration, influencing the behavior of the digital apparatus 800 by affecting the behavior of the CPU 802 with control signals (instructions) and data provided in conjunction with the control signals.

Second or third level storage devices 810 may provide a slower but higher capacity machine memory capability. Examples of storage devices 810 are hard disks, optical disks, large capacity flash memories or other non-volatile memory technologies, and magnetic memories.

The CPU 802 may cause the configuration of the memory 806 to be altered by signals in storage devices 810. In other words, the CPU 802 may cause data and instructions to be read from storage devices 810 in the memory 806 from which may then influence the operations of CPU 802 as instructions and data signals, and from which it may also be provided to the output devices 808. The CPU 802 may alter the content of the memory 806 by signaling to a machine interface of memory 806 to alter the internal configuration, and then converted signals to the storage devices 810 to alter its material internal configuration. In other words, data and instructions may be backed up from memory 806, which is often volatile, to storage devices 810, which are often non-volatile.

Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers).

The network interface 812 receives signals from the memory 806 and converts them into electrical, optical, or wireless signals to other machines, typically via a machine network. The network interface 812 also receives signals from the machine network and converts them into electrical, optical, or wireless signals to the memory 806.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:
1. A multi-server control process comprising:
receiving a stock-keeping unit control from a stock-keeping unit control memory structure, wherein the stock-keeping unit control comprises a current stock-keeping unit stock level for each of one or more stock-keeping units;

receiving a target buffer stock-keeping unit control from a target buffer stock-keeping unit control memory structure, wherein the target buffer stock-keeping unit control comprises a target buffer stock-keeping unit level for each of the one or more stock-keeping units;

comparing the target buffer stock-keeping unit level to the current stock-keeping unit stock level for each of the one or more stock-keeping units;

applying one or more stop signals to multiple servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level;

transitioning the machine state responsive to a start condition for each of the one or more stock-keeping units that have the machine state; and sending one or more start signals to the multiple servers in response to the start condition, wherein the one or more start signals comprise instructions to re-set the presentation status the one or more stock-keeping units to which the start condition applies.

2. The multi-server control process of claim 1, the presentation status is a machine displayed for-sale status.

3. The multi-server control process of claim 1, wherein the one or more stop signals further comprise controls to discontinue selling one or more combination stock-keeping units, wherein the one or more combination stock-keeping units comprise a plurality of stock-keeping units, wherein the one or more combination stock-keeping units discontinued comprises at least one of the one or more stock-keeping units discontinued from sale by the one or more stop signals.

4. The multi-server control process of claim 1 further comprising: the stock-keeping unit control further comprising:

one or more combination stock-keeping units, wherein the one or more combination stock-keeping units comprise a plurality of stock-keeping units;

each of the plurality of stock-keeping units used in each of the one or more combination stock-keeping units;

the quantity of each of the plurality of stock-keeping units sold in each of the one or more combination stock-keeping units; and the current stock-keeping unit stock level for each of the plurality of stock-keeping units used in each of the one or more combination stock-keeping units; comparing the current stock-keeping unit stock level to the target buffer stock-keeping unit level for each of the plurality of stock-keeping units used in each of the one or more combination stock-keeping units;

determining a combination stop condition for each of the one or more combination stock-keeping units, wherein the combination stop condition comprises the current stock-keeping unit stock level being less than or equal to the target buffer stock-keeping unit level; and applying the one or more stop signals to discontinue the presentation status of the one or more combination stock-keeping units in response to the combination stop condition activating.

5. The multi-server control process of claim 4 further comprising sending a presented combination stock-keeping unit stock level for each of the one or more combination stock-keeping units to affect operation of the multiple servers, wherein the presented combination stock-keeping unit stock level is the least of a plurality of presented combination stock-keeping unit stock level components, the plurality of presented combination stock-keeping unit stock level components comprise dividing the current stock-keeping unit stock level less the target buffer stock-keeping unit level by the quantity of each of the plurality of stock-keeping units sold in each of the one or more combination stock-keeping units for each of the plurality of stock-keeping units used in each of the one or more combination stock-keeping units.

6. The multi-server control process of claim 1, wherein the one or more stop signals further comprise controls to alter the presentation status on the multiple servers for each of the one or more stock-keeping units to which the machine state applies.

7. The multi-server control process of claim 1 wherein setting the start condition comprises:

applying a current stock-keeping unit from a current stock-keeping unit control memory structure, wherein the current stock-keeping unit comprises a current actual stock-keeping unit stock level for each of the one or more stock-keeping units;

comparing the current actual stock-keeping unit stock level to the current stock-keeping unit stock level for each of the one or more stock-keeping units that have the machine state; and setting the start condition upon condition that the current actual stock-keeping unit stock level being equal to the current stock-keeping unit stock level.

8. The multi-server control process of claim 1 further comprising applying a stock attrition rate from a stock attrition rate control memory structure, wherein the stock attrition rate comprises an available stock attrition rate for each of the one or more stock-keeping units, wherein determining the target buffer stock-keeping unit level for the one or more stock-keeping units further comprises modifying the target buffer stock-keeping unit level based on the available stock attrition rate.

9. The multi-server control process of claim 1 further comprising displaying on, a machine display, a graphical interface element, wherein the graphical interface element displays stock-keeping unit.

10. The multi-server control process of claim 1 further comprising sending a presented stock-keeping unit stock level for each of the one or more stock-keeping units to affect operation of the multiple servers, the presented stock-keeping unit stock level for each of the one or more stock-keeping units equals the current stock-keeping unit stock level for each of the one or more stock-keeping units less the target buffer stock-keeping unit level for each of the one or more stock-keeping units.

11. A computing apparatus, the computing apparatus comprising: a processor; and a memory storing instructions that, when executed by the processor, configure the apparatus to:

receive a stock-keeping unit control from a stock-keeping unit control memory structure, wherein the stock-keeping unit control comprises a current stock-keeping unit stock level for each of one or more stock-keeping units;

receive a target buffer stock-keeping unit control from a target buffer stock-keeping unit control memory structure, wherein the target buffer stock-keeping unit control comprises a target buffer stock-keeping unit level for each of the one or more stock-keeping units;

compare the target buffer stock-keeping unit level to the current stock-keeping unit stock level for each of the one or more stock-keeping units;

apply one or more stop signals to multiple servers in response to a machine state for one or more of the one or more stock-keeping units, wherein the one or more stop signals comprise controls to discontinue a presentation status of the one or more stock-keeping units to which the machine state applies, wherein the machine state for each of the one or more stock-keeping units is set on condition that the current stock-keeping unit stock level is less than or equal to the target buffer stock-keeping unit level;

transition the machine state responsive to a start condition for each of the one or more stock-keeping units that have the machine state; and send one or more start signals to the multiple servers in response to the start condition, wherein the one or more start signals comprise instructions to re-set the presentation status the one or more stock-keeping units to which the start condition applies.

12. The computing apparatus of claim 11, the presentation status is a machine displayed for-sale status.

13. The computing apparatus of claim 11, wherein the one or more stop signals further comprise controls to discontinue sell one or more combination stock-keeping units, wherein the one or more combination stock-keeping units comprise a plurality of stock-keeping units, wherein the one or more combination stock-keeping units discontinued comprises at least one of the one or more stock-keeping units discontinued from sale by the one or more stop signals.

14. The computing apparatus of claim 11 wherein the instructions further configure the apparatus to:

the stock-keeping unit control further comprising:
one or more combination stock-keeping units, wherein the one or more combination stock-keeping units comprise a plurality of stock-keeping units;
each of the plurality of stock-keeping units used in each of the one or more combination stock-keeping units;
the quantity of each of the plurality of stock-keeping units sold in each of the one or more combination stock-keeping units; and
the current stock-keeping unit stock level for each of the plurality of stock-keeping units used in each of the one or more combination stock-keeping units;
compare the current stock-keeping unit stock level to the target buffer stock-keeping unit level for each of the plurality of stock-keeping units used in each of the one or more combination stock-keeping units;
determine a combination stop condition for each of the one or more combination stock-keeping units, wherein the combination stop condition comprises the current stock-keeping unit stock level being less than or equal to the target buffer stock-keeping unit level; and
apply the one or more stop signals to discontinue the presentation status of the one or more combination stock-keeping units in response to the combination stop condition activating.

15. The computing apparatus of claim 14 wherein the instructions further configure the apparatus to send a presented combination stock-keeping unit stock level for each of the one or more combination stock-keeping units, wherein the presented combination stock-keeping unit stock level is the least of a plurality of presented combination stock-keeping unit stock level components, wherein the plurality of presented combination stock-keeping unit stock level components comprise dividing the current stock-keeping unit stock level less the target buffer stock-keeping unit level by the quantity of each of the plurality of stock-keeping units sold in each of the one or more combination stock-keeping units for each of the plurality of stock-keeping units used in each of the one or more combination stock-keeping units.

16. The computing apparatus of claim 11, wherein the one or more stop signals further comprise controls to alter the presentation status on the multiple servers for each of the one or more stock-keeping units to which the machine state applies.

17. The computing apparatus of claim 11 wherein setting the start condition comprises:

apply a current stock-keeping unit from a current stock-keeping unit control memory structure, wherein the current stock-keeping unit comprises a current actual stock-keeping unit stock level for each of the one or more stock-keeping units;

compare the current actual stock-keeping unit stock level to the current stock-keeping unit stock level for each of the one or more stock-keeping units that have the machine state; and set the start condition upon condition that the current actual stock-keeping unit stock level being equal to the current stock-keeping unit stock level.

18. The computing apparatus of claim 11 wherein the instructions further configure the apparatus to apply a stock attrition rate from a stock attrition rate control memory structure, wherein the stock attrition rate comprises an available stock attrition rate for each of the one or more stock-keeping units, wherein determining the target buffer stock-keeping unit level for the one or more stock-keeping units further comprises modifying the target buffer stock-keeping unit level based on the available stock attrition rate.

19. The computing apparatus of claim 11 wherein the instructions further configure the apparatus to display on, a machine display, a graphical interface element, wherein the graphical interface element displays stock-keeping unit.

20. The computing apparatus of claim 11 wherein the instructions further configure the apparatus to send a presented stock-keeping unit stock level for each of the one or more stock-keeping units to affect operation of the multiple servers, the presented stock-keeping unit stock level for each of the one or more stock-keeping units is the current stock-keeping unit stock level for each of the one or more stock-keeping units less the target buffer stock-keeping unit level for each of the one or more stock-keeping units.

\* \* \* \* \*